Aug. 18, 1942.   G. S. BAYS   2,293,488
APPARATUS FOR DETERMINING PERMEABILITY
Filed April 6, 1938
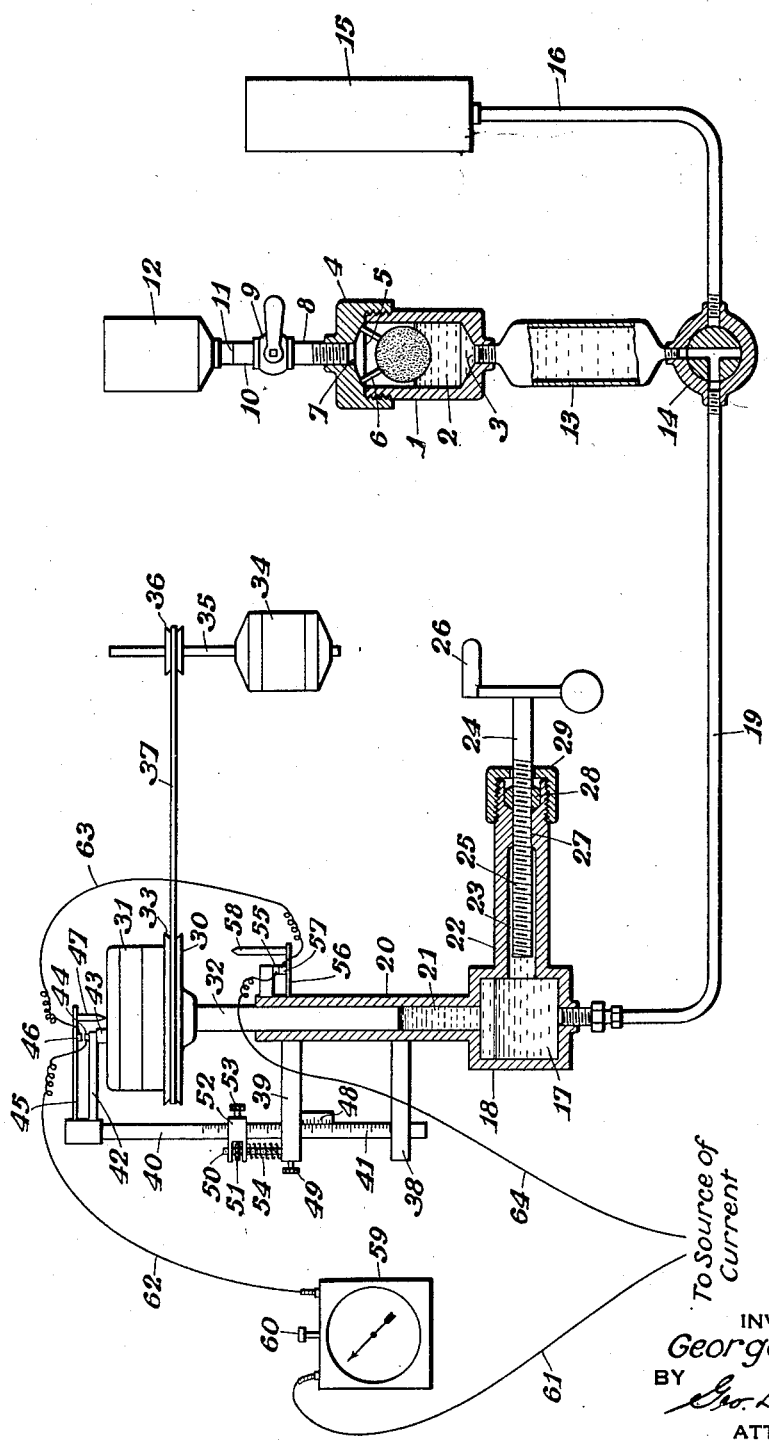
INVENTOR
*George S. Bays*
BY *Geo. L. Parkhurst*
ATTORNEY Patented Aug. 18, 1942

2,293,488

UNITED STATES PATENT OFFICE 2,293,488

APPARATUS FOR DETERMINING PERMEABILITY

George S. Bays, Tulsa, Okla., assignor to Stanolind Oil and Gas Company, Tulsa, Okla., a corporation of Delaware Application April 6, 1938, Serial No. 200,475

7 Claims. (Cl. 73—51)

This invention relates to the determination of the permeability of earth formations and more particularly to an apparatus for determining the permeability and porosity of oil well cores.

In testing oil well cores for their physical properties it is common procedure to include tests for permeability and porosity. Permeability is a measure of the ability of the core to transmit fluid, while porosity is a measure of its void space or pore volume, expressed as a fraction or percent of the total or bulk volume.

These tests are made on small samples of the core, which are cut from the larger samples as taken in a core barrel while drilling a well. Many oil-producing formations are of a firm consolidated nature, and the cores as they come from the well are easily cut, drilled, or otherwise shaped into suitable test specimens for the determination of permeability and porosity. However, other oil-producing formations, particularly sandstones, are of a very loose, friable and weakly consolidated nature, and tests on samples of these formations are extremely difficult because the methods heretofore used for making such tests have required a certain degree of firmness and solidarity of the test specimen in order that worthwhile results may be obtained.

In the usual procedure for determining permeability of oil-producing formations, the core specimen is cut to a standard shape, usually a cylinder, but frequently a cube, and is mounted in a core holder, the purpose of which is to support the specimen in such a way that the sides are sealed off and two parallel plane faces are left uncovered and unsealed. Air, water, oil, or any other suitable fluid is then forced through the core specimen in a direction normal to the two uncovered faces. In the case of a cylindrical specimen, the cylinder is usually placed in a cylindrical hole in the center of a large tapered rubber stopper, which is then placed in a metal part of the testing apparatus which is shaped to receive it and held in position by a threaded follower in such manner that the tapered rubber stopper holding the core specimen is forced into firm contact with the metal part. This results in compression of the stopper and increased pressure on the core specimen.

From the above procedure it will be seen that a sample of an oil-producing formation which may be disintegrated by exerting slight pressure thereon would not lend itself to such a test, nor could it be shaped into a cylinder with a coring drill. Some of the samples of intermediate solidarity are too soft to be formed into cylinders for testing, but may be pared to cubes or right rhombohedrons. Such samples are usually placed in short tubes, and the spaces between the samples and the inner walls of the tubes filled with a plastic material such as sealing wax or a low-melting alloy such as Wood's metal. The test procedure is thereafter the same as for cylindrical samples.

However, many samples, such as those which are commonly encountered in the Gulf Coast fields of Texas and Louisiana, and in many of the fields in California, do not lend themselves to careful shaping, but may be roughly shaped and with careful handling may be moved without appreciable disintegration. My improved method is particularly adapted for testing such samples, although it is also useful for testing more consolidated specimens because of the rapidity with which results may be obtained.

It is recognized that if the core sample, whatever its shape, is not in any way sealed, so that fluid penetration in the permeability test is inward from all its exterior surfaces, the permeability factor measured will be dependent both upon the permeability of the core sample in a direction parallel to the bedding planes in which this sample was laid down in the earth's crust, and the permeability in a direction normal to the bedding planes. The permeability normal to the bedding plane is usually less than that parallel to the bedding planes, but the magnitude of the proportional difference between permeabilities in these two directions is usually much greater for tightly consolidated sands than for loosely consolidated ones. My invention, therefore, is most suitable for testing those cores which are very poorly consolidated, and which could not be tested for permeability at all by the usual methods.

In the case of cores which are well consolidated, and which are known to differ appreciably in their permeabilities measured parallel to and normal to their bedding planes, the use of the apparatus described may be varied by cutting the core sample in right rhombohedral or cylindrical form, and applying a sealing material, such as lacquer, to all surfaces of the sample except two parallel faces. This sample may then be tested according to my invention.

It is an object of my invention to provide an apparatus for rapidly determining the permeability of porous earth formations. Another object is to provide an apparatus for determining the permeability and porosity of oil well cores of weakly consolidated formations without mounting them in core holders or otherwise subjecting them to uneven forces. Another object is to provide an apparatus for determining the porosity, bulk volume and permeability of oil well cores in the same apparatus using a single sample. Other objects will become apparent from the following detailed description read in conjunction with the drawing which shows schematically an apparatus illustrating my invention.

In my preferred form of apparatus a sample container 1 is provided having a sample-receiving chamber 2 formed therein which is open at its upper end and has an outlet 3 at its lower end. The upper end of sample container 1 is externally threaded to receive cap 4, which cooperates with gasket 5 to enclose and seal chamber 2. A number of protuberances 6 depend from the lower surface of cap 4 for the purpose of facilitating uniform coverage of the core sample by the rising mercury meniscus, as hereinbelow described, and preventing the entrapping of air by the rising mercury which, due to its high surface tension and low wetting power, may not completely surround the core unless the core is isolated from contact with the large flat surface of the inside of cap 4. Extending vertically upward from outlet 7 are a nipple 8, a stopcock 9, a portion of glass tubing 10 having a horizontal mark 11 thereon, and an overflow cup 12.

Outlet 3 communicates with the upper portion of volume chamber 13, and the lower portion of chamber 13 with a three-way stopcock 14, which in turn communicates with liquid-receiving container 15 by means of flexible tubing 16, and also with chamber 17 formed in pressure vessel 18 by means of pipe 19.

Pressure vessel 18 has a vertically extending portion 20 provided with an axial bore 21 and a horizontally extending portion 22 provided with an axial bore 23, bores 21 and 23 both communicating with chamber 17. Horizontal portion 22 is provided with a liquid adjustment pump 24 consisting of a screw 25, having a handle 26 on its outer end, and which is in operable relation with a threaded bore 27 coaxial with bore 23. A packing gland 28 and cap 29 are located on the outer end of horizontal portion 22 to make pump 24 liquid-tight under elevated pressures.

Rotary weight table 30, carrying weights 31, is supported on plunger 32, which is adapted to enter bore 21 with small clearance and rest on the fluid therein, and is provided with a grooved periphery 33, so that it may be driven by motor 34 by means of motor shaft 35, pulley 36, and belt 37. Motor 34 may, of course, be started and stopped by well-known means not shown. The purpose of rotating weight table 30 is to prevent possible sticking of plunger 32 in bore 21, thus insuring the application of a constant pressure on the fluid therein by plunger 32.

Horizontal members 38 and 39 are attached to vertical portion 20, and slidably support vertical rod 40, which is provided with graduated scale 41 and which carries on its upper end a horizontal member 42 carrying a stop 43 adapted to arrest the upward movement of weights 31, and insulated contact 44. Rod 40 also supports a spring member 45 carrying insulated contact 46 normally urged against contact 44, and point 47 adapted to cause contacts 44 and 46 to be separated when weights 31 are raised against stop 43. Horizontal member 39 is provided with a vernier scale 48 which cooperates with scale 41 to allow accurate reading of the position of vertical rod 40 and consequently of stop 43.

Rod 40 is adjustably held in position by thumbscrew 49 on horizontal member 39. A threaded rod 50 extends vertically upward from member 39 and is fixed thereto at its lower end. A thumbscrew 51 is operably mounted on rod 50 so that clamp 52 may be raised or lowered thereby, and clamp 52 is provided with a thumbscrew 53 for clamping rod 40. Spring 54 surrounding rod 50 is used to take up the slack in this mechanism. Final accurate adjustment of the setting of rod 40 is effected by tightening thumbscrew 53, loosening thumbscrew 49, turning thumbscrew 51 until the desired setting on scale 41 and vernier 48 is obtained, and finally tightening thumbscrew 49, thus firmly fixing rod 40 in the desired position.

Vertical portion 20 of pressure vessel 18 also supports an insulated contact 55, and a spring member 56 carrying an insulated contact 57 normally urged against contact 55 and a point 58 adapted to cause contacts 55 and 57 to be separated when weight table 30 descends into contact with it.

One terminal of a self-starting electric timer 59 having a resetting arrangement operated by pushrod 60 is connected by means of electrical conductor 61 to a source of electric current, and the other terminal to contact 44 by means of wire 62. Contact 46 is electrically connected to contact 57 by wire 63 and contact 55 to the above-mentioned source of electric current by wire 64 to complete the circuit.

In operation chambers 2, 13 and 17, bores 21 and 23, and pipe 19 are filled with a suitable liquid, such as mercury, oil, or water. Preferably, however, I use mercury, because through its use I am able to determine the bulk volume of the sample as well as its permeability and porosity by my improved method. In the following detailed description of the testing of core samples I will therefore refer to mercury as the test fluid. I also prefer to use a layer of oil above the mercury in chamber 17 and in bore 21 because it aids in lubricating plunger 32 and reduces the variation in pressure due to different positions of plunger 32.

In determining the permeability of a sample of an earth formation, the sample is formed into any regular geometrical shape, which in the case of very soft samples is preferably approximately spherical. If the sample contains liquids in its pores, these should be removed by solvent extraction or other methods before testing. Cap 4 is then removed from sample container 1, the sample is placed in chamber 2 therein, and cap 4 is replaced and tightened against gasket 5. Stopcocks 9 and 14 are then opened so that mercury from chamber 17 and pipe 19, which is under pressure from weights 31 acting through plunger 32, fills chamber 13, enters chamber 2, surrounds the sample therein, and is seen entering glass tubing 10 from below. Stopcocks 14 and 9 are then closed in that order so that the sample will be under substantially atmospheric pressure.

Graduated scale 41 is set approximately at a predetermined value, which is taken from calculated data, thumbscrew 53 is tightened, thumbscrew 49 is loosened, screw 51 is rotated until the setting is precise, as shown by vernier scale 48, and thumbscrew 49 is tightened. Liquid pump 24 is then adjusted, i. e., screw 25 is advanced in bore 23, until weights 31 just bear on stop 43 and point 47 has therefore caused contacts 44 and 46 to be separated, thus causing timer 59 to stop. The predetermined value referred to above is calculated from the bulk volume and the porosity of the sample, and is the distance which plunger 32 must travel in order to displace sufficient mercury to compress the gas in the pores of the sample to a certain standard pressure, which may range for example from 2 to 10 atmospheres.

Timer 59 is reset to zero by means of pushrod 60, and the test is started by starting motor 34, thus causing weight table 30 and plunger 32 to rotate, and then opening three-way stopcock 14 so that chamber 2 and pipe 19 are in communication. The mercury in chamber 2 receives the pressure exerted by the weighted plunger 32, and this pressure causes the mercury to enter the pores of the sample, traveling radially inward. This flow of mercury causes a lowering of plunger 32 and weights 31, so that immediately spring 45 urges contact 46 to rest upon contact 44, closing the electrical circuit and starting timer 59. Finally as plunger 32 descends, weight table 30 depresses point 58 which causes contacts 55 and 57 to be separated, thus breaking the electrical circuit, and stopping timer 59. The elapsed time is then read.

Conversion of elapsed time readings into values of the permeability constant K in darcys may be done by calibration or by calculation, but the latter method is very time-consuming, so that the former is preferred. In using the calibration method, samples of known permeability, porosity and bulk volume are tested in my apparatus, and time readings for mercury penetration to the same final air pressure within the sample may be plotted against the known permeability. This plot may then be used to determine the permeability of any other sample from its mercury penetration time. The data must necessarily be reduced by calculation to a common basis of bulk volume, before plotting and reading the permeability constant from the plot.

While the primary object of my invention is the determination of permeability, it may also be used for determining porosity and bulk volume. In fact, since these data are necessary for the calculation of the permeability constant from the elapsed time obtained by my method, it would be uneconomical of time not to make these tests also while the sample is in the apparatus. These tests are made in the following order: porosity, bulk volume, permeability.

In carrying out the test for porosity, the sample is placed in chamber 2 as hereinabove described after three-way stopcock 14 has been turned to place chamber 13 and tubing 16 in communication and all of the mercury in the system above stopcock 14 has been drained into container 15 which has, of course, been lowered to a position below the level of stopcock 14. Stopcocks 9 and 14 are then closed, liquid pump 24 is adjusted until the top of weights 31 is just touching stop 43, and a reading is made on graduated scale 41. Motor 34 is started and stopcock 14 is turned to place chamber 13 and pipe 19 in communication. When weight table 30 reaches a stationary level, motor 34 is shut off, rod 40 is moved until stop 43 again contacts the top of weights 31, and graduated scale 41 is again read. Preferably the conditions used are such that the mercury substantially fills chamber 13, but does not enter chamber 2. Stopcock 14 is then closed, and stopcock 9 opened to allow air to escape until the pressure in chamber 20 is substantially atmospheric. A similar run is made without the sample in chamber 2. The difference in readings on scale 41 with the sample is then subtracted from the difference in readings without the sample, and the result is the grain volume, i. e., the actual volume occupied by the solid material in the sample.

If the bulk volume of the sample is known, the porosity may be easily calculated from the grain volume as determined by the above described method. The porosity equals the difference between bulk volume and grain volume divided by bulk volume. If the bulk volume is unknown, it may be determined on the same sample used for the grain volume test as follows:

Stopcock 9 is opened and mercury is drained from chamber 13 into container 15 as described above, and pump 24 is adjusted so that the top of weights 31 just touch stop 43, preferably after rod 40 has been raised a suitable distance. Scale 41 is read, motor 34 is started, and stopcock 14 is turned so that chamber 13 and pipe 19 are in communication and mercury is caused to rise in chambers 13 and 2 and surround the sample by the pressure exerted by plunger 32. When the mercury has reached horizontal mark 11 on glass tube 10, stopcock 14 is closed, motor 34 is stopped, rod 40 is lowered until stop 43 and weights 31 are again in contact, and scale 41 is again read. Since this test is run at approximately atmospheric pressure, the mercury does not penetrate the pores of the sample, and the difference between the readings may therefore be used to calculate the volume of the system from stopcock 14 to mark 10 less the bulk volume of the sample. This volume subtracted from the volume obtained by similarly carrying out a calibration run with no sample in chamber 2 gives the bulk volume of the sample.

After the bulk volume test, or if the bulk volume is known, after the porosity test, the permeability test is run. It is only necessary to close stopcock 9 and proceed as directed above. By carrying out these three tests successively in the same apparatus on the same sample, I am able to obtain the desired data very rapidly, and to obtain it on samples which are so poorly consolidated that no data could be obtained by the methods heretofore known.

Necessarily from time to time the mercury in chamber 17 must be replaced, and this is preferably done between successive tests by raising container 15 to a height at least equal to that of pump 24, turning stopcock 14 so that tubing 16 and pipe 19 are in communication, and adjusting pump 24 so that screw 27 is largely withdrawn from bore 23, thus drawing mercury into chamber 17 and withdrawing it from container 15.

It will be apparent that many modifications may be made in my preferred apparatus without departing from the spirit of my invention. For example, the rotating plunger and weights might be replaced by a suitable compressed air or gas reservoir if fitted with suitable accessories.

While I have described my invention in connection with a specific embodiment thereof, I do not desire to be limited thereto, but only by the scope of the following claims.

I claim:

1. An apparatus for determining the permeability of an earth formation comprising a sample-receiving chamber, means for introducing a liquid into said chamber, means for shutting off communication between said chamber and the atmosphere, means for subjecting said liquid to a constant elevated pressure, and means for measuring the time required to introduce a predetermined volume of said liquid into said chamber at said elevated pressure.

2. An apparatus for determining the permeability of an earth formation comprising a sample-receiving chamber, means for shutting off communication between said chamber and the atmosphere, a liquid-supply chamber, a conduit between said sample-receiving chamber and said liquid-supply chamber, a valve in said conduit, means for subjecting the liquid in said liquid-supply chamber to a constant elevated pressure, and means for measuring the time required to cause a predetermined volume of said liquid to flow from said liquid-supply chamber through said conduit into said sample-receiving chamber at said elevated pressure.

3. An apparatus for determining the permeability of an earth formation comprising a sample-receiving chamber, means for introducing a liquid into said chamber, means including a rotating weighted plunger for subjecting the said liquid to a constant elevated pressure, means for limiting the volume of said liquid introduced into said chamber at said constant elevated pressure to a predetermined value, and means for measuring the time required to introduce said predetermined volume of liquid into said chamber.

4. An apparatus for determining the permeability of an oil well core sample comprising a sample-receiving chamber, means for shutting off communication between said chamber and the atmosphere, a liquid supply chamber, a conduit between said sample-receiving chamber and said liquid-supply chamber, a valve in said conduit, a vertical weighted plunger adapted to exert a constant elevated pressure on the liquid in said liquid-supply chamber, means for rotating said plunger, a pump in communication with said liquid-supply chamber adapted to raise said plunger, adjustable means for limiting the movement of said plunger, means associated with said adjustable means for closing an electrical circuit when said plunger leaves one limiting position, means for opening said circuit when said plunger reaches the other limiting position, and a timing means in said circuit.

5. An apparatus for determining the porosity and permeability of an earth formation comprising a sample-receiving chamber, means for shutting off communication between said chamber and the atmosphere, means for supplying a liquid to said chamber at a constant elevated pressure, means for withdrawing said liquid from said chamber, means for measuring the volume of liquid supplied to said chamber, and means for measuring the time required to introduce a predetermined volume of said liquid into said chamber.

6. An apparatus for determining the porosity, bulk volume and permeability of an earth formation comprising a sample-receiving chamber, a conduit communicating between said chamber and the atmosphere, a valve in said conduit, means associated with said conduit for observing the liquid level therein, means for supplying a liquid to said chamber at a constant elevated pressure, means for withdrawing said liquid from said chamber, means for measuring the volume of liquid supplied to said chamber, and means for measuring the time required to introduce a predetermined volume of said liquid into said chamber.

7. An apparatus for determining the porosity, bulk volume and permeability of an oil well core sample comprising a sample-receiving chamber, a conduit communicating between said chamber and the atmosphere, a valve in said conduit, means associated with said conduit for observing the liquid level therein, a liquid-supply chamber, means for placing said liquid-supply chamber in communication with said sample-receiving chamber, means for withdrawing liquid from said sample-receiving chamber, a weighted plunger adapted to exert a constant elevated pressure on the liquid in said liquid-supply chamber, means for rotating said plunger, a pump in communication with said liquid-supply chamber adapted to adjust the position of said plunger, means for measuring the volume of liquid supplied to said sample-receiving chamber, and means for measuring the time required to introduce a predetermined volume of said liquid into said sample-receiving chamber.

GEORGE S. BAYS.